July 6, 1943.  W. HOWEY  2,323,752
PHOTO ENGRAVING PROCESS AND PRODUCT
Filed Dec. 26, 1939
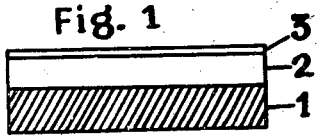
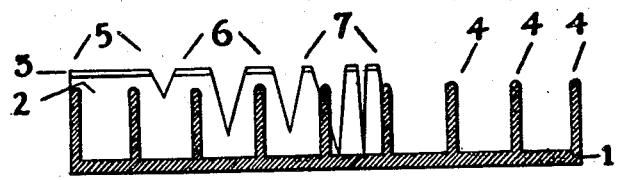
Walter Howey INVENTOR
By N.S. Amstutz
Attorney Patented July 6, 1943

2,323,752

UNITED STATES PATENT OFFICE 2,323,752

PHOTOENGRAVING PROCESS AND PRODUCT

Walter Howey, Boston, Mass.

Application December 26, 1939, Serial No. 310,878

12 Claims. (Cl. 95—5.6)

This invention presents a novel and improved method of preparing plates for photoengraving and engraving the plates. It reduces the time and labor involved in the practice of photoengraving. To make the invention clear to those skilled in the arts:

Figure 1 shows a three layer engravers' plate with a base layer 1 an intermediate layer 2 which may be composed of chlorinated rubber and a light sensitive top layer 3.

Figure 2 shows a plate with a base layer 1 having preformed spaced pillars terminating in a plane 4 an intermediate layer 2 which may consist of chlorinated rubber, filling the space between the pillars of layer 1 and terminating in a plane surface approximately level with or above the level of the terminal plane of the pillars, and a light sensitive top layer 3.

Figure 3 shows a print proofed from a plate constructed and etched after the method disclosed by Figure 2.

Printing plates commonly used in the relief and intaglio arts may consist of but two layers, the photosensitive wash off etch resistant top layer and a base layer, commonly of zinc, copper or other metal suitable for etching into which the image is engraved.

Rubber plates have been found useful, particularly for relief printing. They usually are engraved by hand or moulded from a matrix. Cured or vulcanized rubber is not readily soluble in an etching medium. A new chemical product of rubber, known as chlorinated rubber, has the desirable quality of being selectively and rapidly soluble in solvents of its compounds.

In carrying out my invention a plate may be prepared as indicated by Figure 1 using a base layer of any of the soluble materials suitable for photoengraving, such for example as zinc, copper, magnesium, aluminum, steel, or any other suitable material. The base may be coated with an intermediate layer 2 which may consist of a chlorinated rubber compound. This in turn is coated with a light sensitive washoff emulsion 3.

This invention makes use of certain recent inventions in the chemistry of rubber which have produced new and hitherto unknown rubber halogen compounds, such as chlorinated rubber, which have become highly useful in the decorative and domestic arts. These halogen rubber compounds differ from other rubber compounds and from vulcanized rubber in their rapid and selective solubility by easily secured commercial solvents which will not rapidly dissolve vulcanized rubber or rubber in other resin, and homogeneous forms. This rapid solubility of the halogen rubber makes it useful as disclosed in this invention, to form a rubber printing plate that may be photoengraved with solvents as zinc and copper plates are photoengraved. This is a great improvement in the engraving of rubber printing plates which heretofore were only engraved by being cut by hand or formed in the simulation of a true engraving through matrix casting and vulcanization. This invention provides a rapid photoengraved rubber printing plate as an improvement over the slow hand cutting and vulcanized electrotyping of rubber plates in common use.

One advantage of such construction is that chlorinated rubber will not fog either a silver washoff emulsion or a light sensitive chromic or bichromate layer or a layer having silver halide and chromic or bichromate components. Metal commonly used in photoengraving will fog light sensitive layers so rapidly that silver halides are not commonly used for photoengraving and bichromate layers usually are used almost as soon as they have been coated.

Chlorinated rubber is a chemical modification of natural rubber which alters its elasticity into a hard, tack free waterproof coating, resistant to inorganic acids, alkalies and alcohol but soluble in some organic solvents. It has high adhesive qualities and will expand or contract with the base, a desirable attribute in printing registry. It may be routed without separating from the base layer.

Printing plates surfaced with chlorinated rubber may be coated with light sensitive layers in quantities and stored for future use.

Chlorinated rubber coated plates may be etched rapidly in solvents which will not attack the top light sensitive layer or the base layer. Among these solvents are benzol, toluol, xylol, carbon tetrachloride and other organic solvents.

One example of this invention is to use a zinc base 1 and coat the same with a layer consisting of a chlorinated rubber compound having a uniform thickness which may vary for example between one and four mils. The thickness may be varied to provide variable results governed by the number of lines in the separation screen to be used for half tone engraving. For engraving a 65 screen half tone commonly desired for newspaper halftones a chlorinated rubber coating approximately two and a half to three mils thick may be found satisfactory. The thickness of the layer may best be determined by the depth that may be taken with a first bite without marring the printing qualities of the image to be etched. When a finer screen is used the chlorinated rubber coating may be made approximately one and a half mils or less in thickness. The disclosed thickness is for the purpose of illustration and no limitation to secure any desired effect is implied.

The plate after having been coated with light sensitive washout layer 3 may be photographically exposed after the manner of line or half tone photoengraving and soluble sections of the light sensitive layer may be developed away as practiced in the art. The plate may then be etched to the base layer in one bite with a solvent such as carbon tetrachloride, xylol, toluol, benzol or any other suitable solvent for chlorinated rubber which will not dissolve the top light sensitive photographic resist.

This immediately will provide an engraved plate suitable for some forms of printing.

For half tone printing on news print it may be desirable to etch a sixty-five screen halftone to depths varying from 5 to 7 mils. In photoengraving metal plates it is customary to make a shallow first etch and then stage the plate by rolling an etch resistant ink similar to that described in my U. S. Patent No. 2,062,028 against the sides of the dot or line image or by dusting and baking dragons' blood against the sides of the image to prevent destruction of the printing structure from acid side action.

This complicated method of alternately etching and rolling up may require one hundred or more manual operations and much time.

This invention discloses how the required depth for printing may be accomplished without intermediate steps. The zinc plate after etching to the surface of base 1 may be etched in a single bite thereafter to a satisfactory depth in a bath of approximately 10% nitric acid in water. The plate then is ready for printing.

Should the base be of aluminum it may be etched with spent iron perchloride and hydrochloric acid. If of copper or steel it may be etched with iron perchloride, as is customary in the arts. None of these mordants will dissolve the chlorinated rubber layer.

It is not essential that the base be composed of metal. It may be made from any other substance suitable for etching with a rapid solvent not common as a solvent for the intermediate layer and the light sensitive layer. Examples of such materials are nitrated cellulose compounds which may be etched with acetone or other solvents known to the art to which chlorinated rubber is so slightly soluble as to constitute a satisfactory resist during the period of time required to etch the base layer.

These examples show how the method may be used to provide a flexible printing plate desired for some forms of printing such as bags.

Figure 2 discloses how this invention may be utilized to dispense with other steps common to the photoengraving art. Base layer 1 is preformed with a face terminating in thin spaced pillars 4 the terminals of which lie in the same plane and which are spaced over the area of the plate in sufficient number and with sufficient separation to hold paper or other material being printed upon away from ink that may become lodged on the base of the plate while printing is being done. The pillars may be rounded at their terminals and so small in area as to contribute little if any visible distortion of an image engraved into the plate.

In this cross section view of a half tone engraving the shadows 5, the middle tones 6, and the highlight details 7 extend above the points of the pillars 4 to indicate how this method may be used to produce an engraved half tone or line cut and a relief half tone or line cut in but one operation.

This invention provides an improvement in the customary photoengraving method of engraving a so called highlight dot in line and half tone reproductions. Engraving highlight dots is the most difficult and arduous work in photoengraving practice. Highlight dots are engraved deeper than solids or middletones. The customarily are engraved to give to the eye the illusion of white. Consequently pains are involved to etch them as fine as possible and avoid distortion through acid side action. The illusion of white in the process is not true but degraded. The highlight dot often is engraved to serve no other purpose than to hold a surface of paper or other material to be printed away from depressions engraved to simulate white so the printing will not be marred by ink lodged in these depressions. The number of highlight dots in a screen halftone may arbitrarily vary with the square of the number of cross lines per inch in the screen. Thus a 50 line screen would have 2500 highlight dots to the square inch and a 100 line screen 10,000 dots. A 100 line screen would provide more visible detail in the image printed yet it becomes obvious that a more pleasing reproduction would result could the number of highlight dots of a 100 line screen be made 2,500 instead of 10,000 to the square inch.

This invention provides for such an arrangement, if desired, or even a better arrangement for printing a simulation of white more true to the original copy than could be made with the complicated combination using a 100 line screen for the image and a 50 line screen for the highlights.

Good half tone impressions have been made by using as few as 160 supporting pillars to the square inch. The pillars were so formed with rounded instead of the customary flat photoengraved surfaces of photoengraved highlight dots to present to the eye an approximately true illusion of white in a relief half tone instead of the degraded illusion of white presented with highlight dot etching. The pillars leave no shoulders, which in highlight engraving practice commonly call for expert reetching. The base layer 1 having preformed pillars may be composed of a material so slowly soluble or so insoluble to solvents for the top and intermediate layers, that unless fancy desires, their original form need not be altered by etching.

The preformed spaced pillars of the base layer function differently from the preformed grained base layers used in lithography. Such plates, usually of zinc or aluminum are pitted by graining with marbles and fine sand to make water absorbing pits in the metal as a resist to the greasy ink of the image.

The degree of relief in such grained plates is slight. The degree of relief in the pillars used in my plate may be as much as approximately five to seven mils or more.

This invention dispenses with a highlight screen exposure unless it may be desired for highlight detail of the image. Highlights may be dropped out entirely.

Base 1 of Figure 2 may be preformed by casting, knurling, cutting or shaping in any suitable manner. On this base is fixed intermediate layer 2 filling the spaces between the pillars and projecting to a plane surface which may be made approximately level with the terminals of the pillars.

An engraving having the printing qualities of an overlayed or underlaid plate may be produced during the process of etching by building intermediate layer 2 to a plane surface higher than the plane terminal of the pillars 4 of base layer 1. The degree of bump, as this is known to the trade, may be varied by varying the height of layer 2 above the plane of pillar terminals 4.

A plate so constructed may be engraved by printing the image to layer 3 from a negative, or if desired for some effects a positive. After developing the washout layer 3 the plate may be etched through layer 2 with a suitable solvent for such layer that will not rapidly etch the pillars or the base layer. Should the intermediate layer consist of a rubber compound, such as chlorinated rubber, the etching medium may be carbon tetrachloride or other organic solvents. In working this method for a bumped effect the intermediate layer may consist of a layer of cellulose acetate or nitrate applied to the base layer and a third layer of chlorinated rubber applied to the cellulose layer. Since the pillars of the base layer may be so widely separated and fine in structure as to convey little if any visible impression to the printed page their presence will not deform the image.

For the purpose of simple explanation a plate having three layers is shown in the drawing and description. However, the plate may consist of four or more layers not rapidly soluble in the solvents used to dissolve each separate layer as has been described above.

Making a bumped plate commonly is practiced by etching a separate plate of thin metal and dropping out all highlights, or cutting paper underlays by hand, fixing the underlay in register with the engraved image under the engraving and applying hydraulic pressure to raise the solids and middle-tones above the printing plane of the highlights.

Figure 3 shows an imprint of a three or more layer engraved plate in accordance with the disclosure regarding Figure 2.

The pillars 4 were purposely made with flat printing surfaces and large in area so they may be seen with the naked eye. The image "Fig. 3," was set in 36 Cable bold with a ruled border. An inked proof was pulled on unexposed negative film. The film was exposed and developed and the ink removed. The negative image was reversed and projected to the light sensitive surface of the plate.

The plate was developed to leave the reading matter and line border etch resistant. The chlorinated rubber layer then was etched until the supporting pillars 4 of the base layer 1 were exposed. The whole process was performed in one bite.

This discloses my method of making shallow line engravings in one bite having sufficient depth for suitable printing. Line engravings without the pillar support disclosed in the intermediate layer, or without a highlight background require as many as four bites and as much as four times the etched and routed depth.

After line engravings have been etched as deeply as possible it is common practice to finish the plates by hand routing to gain enough depth to prevent the image becoming smudged from ink lodged in the bottoms of the plate. Preformed pillars 4 make such work by my method not necessary.

Combination line and tone engraving by this method require no more depth than half tone engraving. The preformed pillars, by variation in printing area, separation and shape may be used to present, instead of the illusion of white variations in background patterns known to the arts as stipple or Ben Day.

Although this disclosure sets forth the desirability of chlorinated rubber to be used as an intermediate layer many resins which are selectively soluble and many other materials not commonly soluble in the solvents for the base plate may be used instead. This invention reserves the right to use suitable alternatives for the intermediate layer.

Although the invention is adopted for the preparation of relief printing plates the structure of Fig. 1 may also be applied to some type of intaglio printing plates, such as gravure, as becomes obvious to those skilled in the arts.

Etching by electrolytic deplating may be used as an alternative in carrying out this method. An intermediate layer of chlorinated rubber will resist such etching.

By chlorinated rubber is meant any suitable chlorinated rubber compound which may include plasticizers, pigments, resins, inerts or other material to the extent of not destroying the solubility of the compound.

By base layer is meant one of the layers in a three or more layer engravers' plate and not the base upon which this plate may be mounted to make it type high.

What I claim is:

1. The method of making an engravers' plate which consists in preforming a base layer with spaced apart disconnected projecting members approximately normal to the plane of said base, coating the said base between the projections with an intermediate etchable layer chlorinated rubber to form a printing surface on a plane corresponding to the upper face of said projections, and covering the intermediate layer with a light sensitive coating.

2. The method of making an engravers' plate which consists in preforming a base with disconnected projections of approximately uniform diameter constituting supporting members in spaced apart relation on its surface forming preformed highlight dots, filling the space between said members or dots with an intermediate layer chlorinated rubber that is soluble in solvents which will not dissolve the said projections, and coating the upper surface of the intermediate layer with a light sensitive coating.

3. In a process of photoengraving, a plate consisting of chlorinated rubber in the form of a solid, means for coating the surface of the plate with a light sensitive etch resistant layer, means for producing an image in the etch resistant layer, means for washing away portions of the etch resistant layer which do not bear the image, and means for etching a reproduction of the image in relief upon the surface of the chlorinated rubber plate.

4. A photoengraving process which consists of forming a solid plate of chlorinated rubber having no light sensitive characteristics, coating the plate with a wash-off photographic layer, producing an image in the light sensitive layer by photographic means, developing the photographic layer to lay bare all portions of the surface of the chlorinated rubber plate except those portions coated by the light sensitive photographic layer, hardening the image portion of the light sensitive photographic layer to serve as a resist to an etching medium, and etching a relief image into the chlorinated rubber plate with a solvent for chlorinated rubber.

5. In a process of photoengraving, a hard relief printing plate consisting of chlorinated rubber having no light sensitive photographic characteristics, means for coating the plate with a thin layer consisting of a light sensitive etch resistant medium, means for exposing the coated plate to an object to produce a photographic image in the light sensitive layer, means to fix the image in the layer and develop away all other portions of the layer to expose the surface of the chlorinated rubber plate, and means for engraving by an etching medium a relief printing plate which will imprint the image.

6. In a process of photoengraving means for forming liquid chlorinated rubber into a hard plate suitable for relief printing, means for coating the surface of the plate with an etch resistant light sensitive layer, photographic means for producing an image in the light sensitive layer, means for developing the image and removing all portions of the etch resistant layer not bearing the image, means for etching a relief printing reproduction of the image into the plate.

7. In a photoengraving process, means for impregnating a plate having preformed highlight relief printing dots with a solid chlorinated rubber compound to a surface level approximately no lower than the tips of the dots, means for coating the surface of the plate so formed with a light sensitive wash off etch resistant layer, means for forming a photographic image in the light sensitive layer, means for developing and fixing the image in the light sensitive layer and exposing the surface of chlorinated rubber not covered by the etch resistant image, and means for etching a relief printing facsimile of the image only into the chlorinated rubber.

8. In a photoengraving process, means for impregnating a plate having preformed highlight relief printing dots composed of matter not soluble in a solvent for chlorinated rubber, with a solid chlorinated rubber compound to a surface level no lower than the tips of the highlight dots, means for coating the surface of the chlorinated rubber compound with an etch resistant light sensitive photographic emulson, means for forming an image in the emulsion by photographic exposure, means for developing and fixing the image in the etch resistant layer, means for dissolving the portions of the etch resistant layer carrying no image to bare the surface of chlorinated rubber, and means for etching a relief image into the chlorinated rubber.

9. In a photoengraving process, means for forming a plate having pregrooved relief highlight dots of matter that is not rapidly soluble in an etching medium, means for filling the space between the dots to form a plane surface with a solid compound that may be etched by a solvent not common as a solvent for the structure of the highlight dots, means for coating the surface of the layer with a light sensitive etch resistant photographic layer, means for photographically producing an image in the light sensitive layer, means for dissolving the non image bearing portions of the light sensitive layer, and means for etching a relief printing replica of the image into the chlorinated rubber compound between the highlight dots.

10. In a process of photoengraving, means for forming a plate composed of matter not readily soluble by etching media to bear a surface of relief highlight type dots, means for filling the space between the relief highlight dots with a compound of chlorinated rubber that is readily soluble in etching media to form an approximate plane surface, means for covering the plane surface with a layer of light sensitive etch resistant photographic emulsion, means for exposing the layer to form a photographic image in this emulsion, means for developing the image and washing away the non image bearing portions of the emulsion, means for hardening the emulsion, and means for etching a relief printing image into the soluble compound.

11. In a process of photoengraving, means for forming a plate composed of preformed comparatively insoluble highlight dots and soluble solid matter of chlorinated rubber between the dots, means for coating the plate with a light sensitive etch resistant layer, means for exposing the etch resistant layer to form a photographic image, means for developing the image, means for hardening the image, means for washing away all portions of the light sensitive layer not bearing the image, and means for etching a relief printing reproduction of the image into the compound between the comparatively insoluble highlight dots.

12. In a process of photoengraving, means for forming a plate composed of preformed comparatively insoluble highlight relief areas, means for filling the space between the highlight relief areas with chlorinated rubber to form a plane surface, means for coating the plane surface with an etch resistant light sensitized layer, means for photographically forming an image in the light sensitive layer, means for developing the light sensitive layer, means for washing away such portions of the light sensitive layer as do not form the image, and means for etching into the soluble matter filling the space between the highlight areas to form a three dimensional printing reproduction of the image.

WALTER HOWEY.